US009141775B2

(12) United States Patent
Yun (10) Patent No.: US 9,141,775 B2
(45) Date of Patent: Sep. 22, 2015

(54) MASHUP SERVICE SUPPORT METHOD AND APPARATUS

(75) Inventor: Tae-jung Yun, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 1490 days.

(21) Appl. No.: 12/112,068

(22) Filed: Apr. 30, 2008

(65) Prior Publication Data

US 2009/0063862 A1 Mar. 5, 2009

(30) Foreign Application Priority Data

Sep. 4, 2007 (KR) .................. 10-2007-0089400

(51) Int. Cl.
 *G06F 21/31* (2013.01)
(52) U.S. Cl.
 CPC ........ *G06F 21/31* (2013.01); *G06F 2221/2119* (2013.01)
(58) Field of Classification Search
 CPC .................. G06F 21/31; G06F 2221/2119
 USPC ............................................................ 726/30
 See application file for complete search history.

(56) References Cited

U.S. PATENT DOCUMENTS

| 5,495,533 | A  | * | 2/1996  | Linehan et al.     | 713/155   |
|-----------|----|---|---------|--------------------|-----------|
| 5,926,796 | A  | * | 7/1999  | Walker et al.      | 705/16    |
| 6,351,813 | B1 | * | 2/2002  | Mooney et al.      | 713/185   |
| 6,584,507 | B1 |   | 6/2003  | Bradley et al.     |           |
| 6,651,168 | B1 | * | 11/2003 | Kao et al.         | 713/185   |
| 2003/0028614 | A1 | * | 2/2003  | Jeon             | 709/217   |
| 2003/0220993 | A1 | * | 11/2003 | Blizniak et al.  | 709/223   |
| 2003/0228866 | A1 | * | 12/2003 | Pezeshki         | 455/422.1 |
| 2004/0123152 | A1 | * | 6/2004  | Le Saint         | 713/201   |
| 2004/0181674 | A1 | * | 9/2004  | Theimer          | 713/182   |
| 2004/0214560 | A1 | * | 10/2004 | Date et al.      | 455/418   |
| 2005/0203909 | A1 | * | 9/2005  | Zhao             | 707/10    |
| 2005/0273844 | A1 | * | 12/2005 | Dapkus et al.    | 726/9     |
| 2007/0026855 | A1 |   | 2/2007  | Enenkiel         |           |
| 2007/0078991 | A1 | * | 4/2007  | Kim              | 709/228   |
| 2007/0088807 | A1 | * | 4/2007  | Moore            | 709/217   |
| 2007/0260636 | A1 | * | 11/2007 | Baio et al.      | 707/104.1 |
| 2008/0082539 | A1 | * | 4/2008  | Doane et al.     | 707/9     |
| 2008/0197972 | A1 | * | 8/2008  | Lawson et al.    | 340/5.86  |
| 2008/0222237 | A1 | * | 9/2008  | Nathan et al.    | 709/202   |
| 2008/0301685 | A1 | * | 12/2008 | Thomas et al.    | 718/102   |
| 2008/0313648 | A1 | * | 12/2008 | Wang et al.      | 719/315   |
| 2009/0060178 | A1 | * | 3/2009  | Montgomery et al.| 380/44    |

OTHER PUBLICATIONS

Nath et al., Challenges in Building a Portal for Sensors World-Wide, Sep. 2006, Microsoft Technical Report MSR-TR-2006-133 [online], Retrieved from the Internet <URL: http://research.microsoft.com/pubs/70346/tr-2006-133.pdf>, pp. 1-8.*

(Continued)

*Primary Examiner* — Kenneth Chang
(74) *Attorney, Agent, or Firm* — Staas & Halsey LLP (57) ABSTRACT

A mashup service support method includes externally receiving a mashup service application, acquiring and managing an authentication key corresponding to the received mashup service application, and executing the received mashup service application using the acquired authentication key. A user can use a variety of web services by normally operating a mashup service application through Open API due to the storing and managing of an authentication key.

21 Claims, 9 Drawing Sheets

(56) References Cited

OTHER PUBLICATIONS

Adams et al., IDUP and SPKM: Developing Public-Key-Based APIs and Mechanisms for Communication Security Services, Feb. 1996, Proceedings of the Symposium on Network and Distributed System Security, pp. 128-135.*

Korean Office Action mailed Apr. 18, 2012 issued in corresponding Korean Patent Application No. 10-2007-0089400.

* cited by examiner

```
<!DOCTYPE html PUBLIC "-//W3C//DTD XHTML 1.0 Strict//EN"
  "http://www.w3.org/TR/xhtml1/DTD/xhtml1-strict.dtd">
<html xmlns="http://www.w3.org/1999/xhtml">
  <head>
    <meta http-equiv="content-type" content="text/html; charset=utf-8"/>
    <title>Google Maps JavaScript API Example</title>              /400
    <script src="http://maps.google.com/maps?file=api&v=2&key=authentication Key"
     type="text/javascript"></script>
    <script type="text/javascript">
    //<![CDATA[
    function load() {
      if (GBrowserIsCompatible()) {
        var map = new GMap2(document.getElementById("map"));
        map.setCenter(new GLatLng(37.4419, -122.1419), 13);
      }
    }
    //]]>
    </script>
  </head>
  <body onload="load()" onunload="GUnload()">
    <div id="map" style="width: 500px; height: 300px"></div>
  </body>
</html>
```

```
<!DOCTYPE html PUBLIC "-//W3C//DTD XHTML 1.0 Strict//EN"
    "http://www.w3.org/TR/xhtml1/DTD/xhtml1-strict.dtd">
<html xmlns="http://www.w3.org/1999/xhtml">
  <head>
    <meta http-equiv="content-type" content="text/html; charset=utf-8"/>
    <title>Google Maps JavaScript API Example</title>
    <script src='http://maps.google.com/maps?file=api&v=2key=abcdefg"
        type="text/javascript"></script>
                                                                    700
    <script type="text/javascript">
    //<![CDATA[ function load() {
      if (GBrowserIsCompatible()) {    702
        var map = new GMap2(document.getElementById("map"));
        map.setCenter(new GLatLng(Lat,Long), 13);
        map.openInfoWindow(map.getCenter(), document.createTextNode("Here"));
      }
    }

//]]>
    </script>
  </head>
  <body onload="load()" onunload="GUnload()">
    <div id="map" style="width: 500px; height: 300px"></div>
  </body>
</html>
```

MASHUP SERVICE SUPPORT METHOD AND APPARATUS

CROSS-REFERENCE TO RELATED APPLICATION

This application claims the benefit of Korean Patent Application No. 2007-89400 filed in the Korean Intellectual Property Office on Sep. 4, 2007, the disclosure of which is incorporated herein by reference.

BACKGROUND OF THE INVENTION

1. Field of the Invention

Aspects of the present invention relate to an electronic device providing a web service, and more particularly, to a technology for providing a mashup service suitable for a device using one or more Open APIs (application programming interface).

2. Description of the Related Art

A conventional electronic device providing a web service includes a processing unit that processes web information, a wireless interface that connects the electronic device to a network in order to acquire the web information from a web server, and a storage medium that stores the web information. Since the conventional technology merely provides a single web service using the above elements, only the information that the web service provides is available to the user. Recently, a mashup service has been suggested that provides totally new services or fusion applications by receiving data from web services or companies that provide Open API. Since an authentication process needed to provide the mashup service is not properly managed to date, the user may have difficulty in using the mashup service.

SUMMARY OF THE INVENTION

Aspects of the present invention provide a method and apparatus for supporting a mashup service by storing an authentication key value to normally operate a mashup service application through Open API in a device and managing the authentication key value so that a user can use a variety of mashup services.

According to an aspect of the present invention, a mashup service support method is provided. The method comprises externally receiving a mashup service application, acquiring and managing an authentication key corresponding to the received mashup service application, and executing the received mashup service application using the acquired authentication key.

According to another aspect of the present invention, a computer readable recording medium comprising a program to execute a mashup service support method is provided. The method comprises externally receiving a mashup service application, acquiring and managing an authentication key corresponding to the received mashup service application, and executing the received mashup service application using the acquired authentication key.

According to another aspect of the present invention, a mashup service support apparatus is provided. The apparatus comprises a network interface unit to transmit and receive data, a control unit to externally receive a mashup service application, to acquire and manage an authentication key corresponding to the received mashup service application, and to execute the mashup service application using the acquired authentication key, a storing unit to store the mashup service application and an authentication key database, and a user interface unit to assign an interface with a user.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
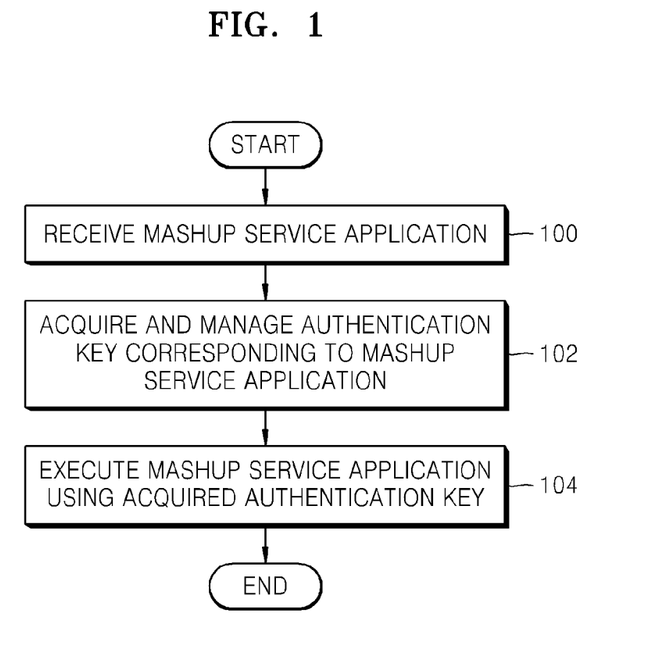
FIG. 1 is a flowchart explaining a mashup service support method according to an embodiment of the present invention.

FIG. 1 is a flowchart explaining a mashup service support process according to an embodiment of the present invention. A mashup service application is externally provided in Operation 100. The term "mashup service application" refers to a program generating a new service using various Open APIs. An API (application programming interface) defines basic functions, for example, functions provided by an operating system, a programming language, and a standard library, to write an application. The term "Open API" refers to an action to request necessary information through the Internet and receiving a result based on the request.

A mashup service application is an application including device-executable codes including binary codes, execution codes, source codes, web pages, or other content. The mashup service application can be acquired from mashup service providers connected to a wired or wireless network or from mashup service providers connected to a local area network (LAN). The wired/wireless network includes Ethernet and Internet, a wired interface using a cable, and a wireless interface, such as Bluetooth or Wi-Fi. The mashup service provider connected to a LAN includes a local computer or a portable memory.

Figure 2:
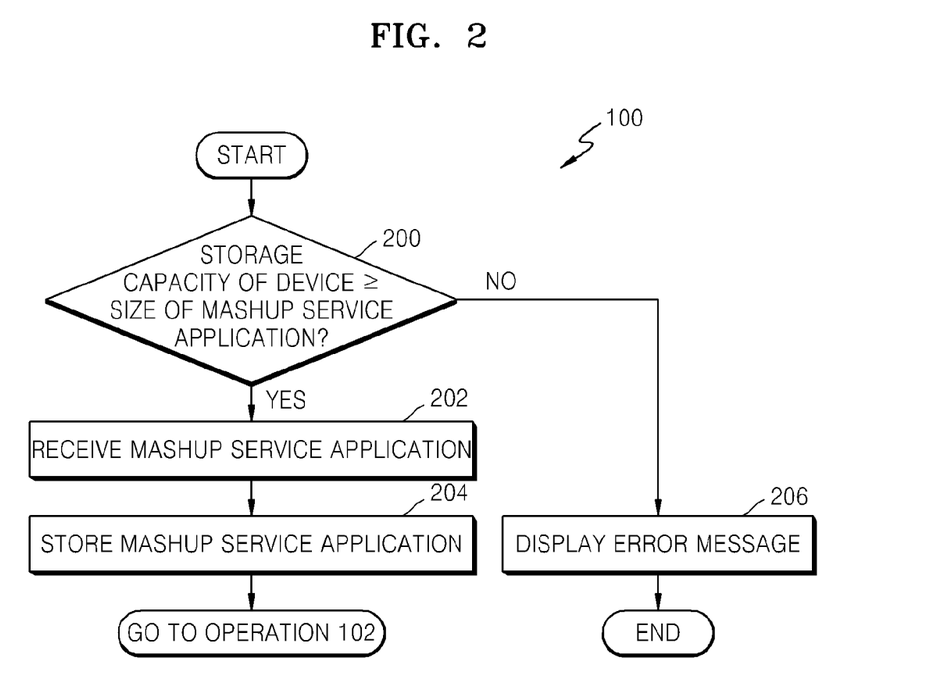
FIG. 2 is a flowchart explaining Operation 100 of FIG. 1.

FIG. 2 is a flowchart explaining Operation 100 of FIG. 1. Whether the storage capacity of a device is sufficient to store a mashup service application is determined in Operation 200. If the storage capacity of a device is sufficient to store the mashup service application, the mashup service application is received in Operation 202. The mashup service application is received from an external device connected to a network or LAN. The mashup service application is stored in the device in Operation 204. If the storage capacity of the device is insufficient to store the mashup service application, an error message, such as "The mashup service application cannot be stored", is displayed in Operation 206.

Returning to FIG. 1, an authentication key corresponding to the provided mashup service application is acquired and managed in Operation 102. The Open API service provider assigns an authentication key for each user or service to manage or limit the user of a web service. Since the mashup service using Open API needs to provide the authentication key in response to a query of the Open API, the authentication key is stored in the storage space of the device and managed.

Figure 3:
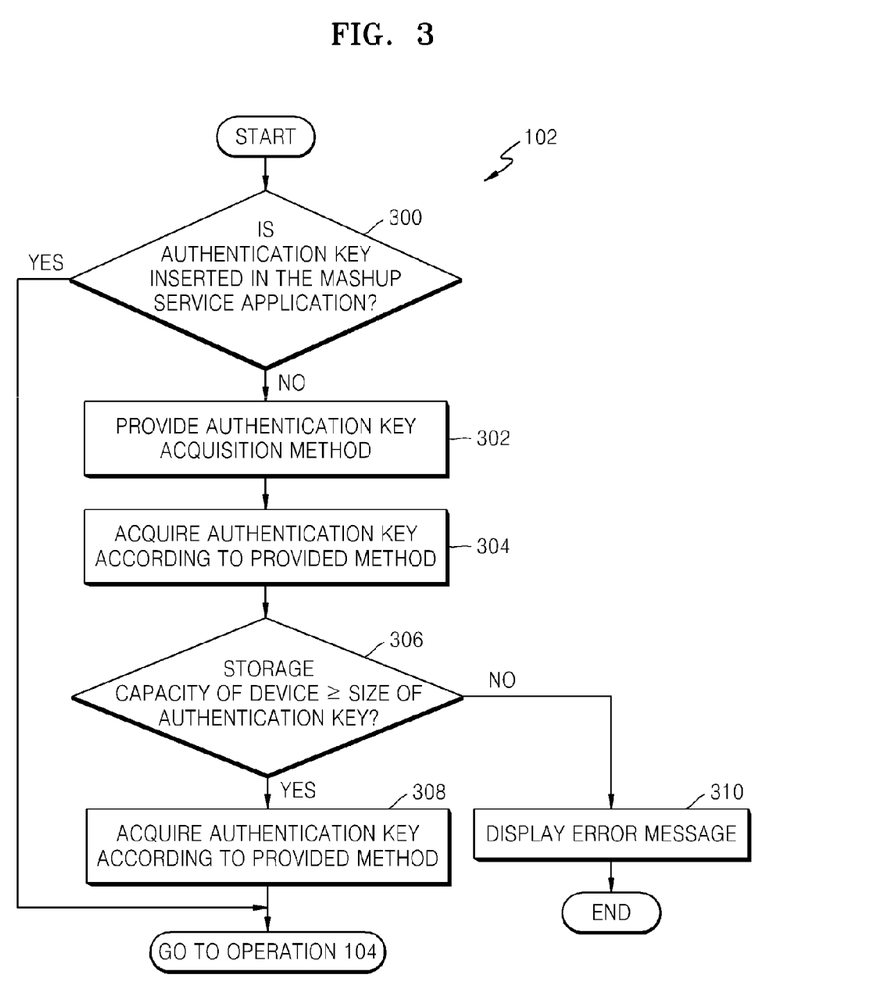
FIG. 3 is a flowchart explaining Operation 102 of FIG. 1.

FIG. 3 is a flowchart explaining Operation 102 of FIG. 1. Whether the authentication key is inserted in the provided mashup service application is determined in Operation 300.

Figure 4:
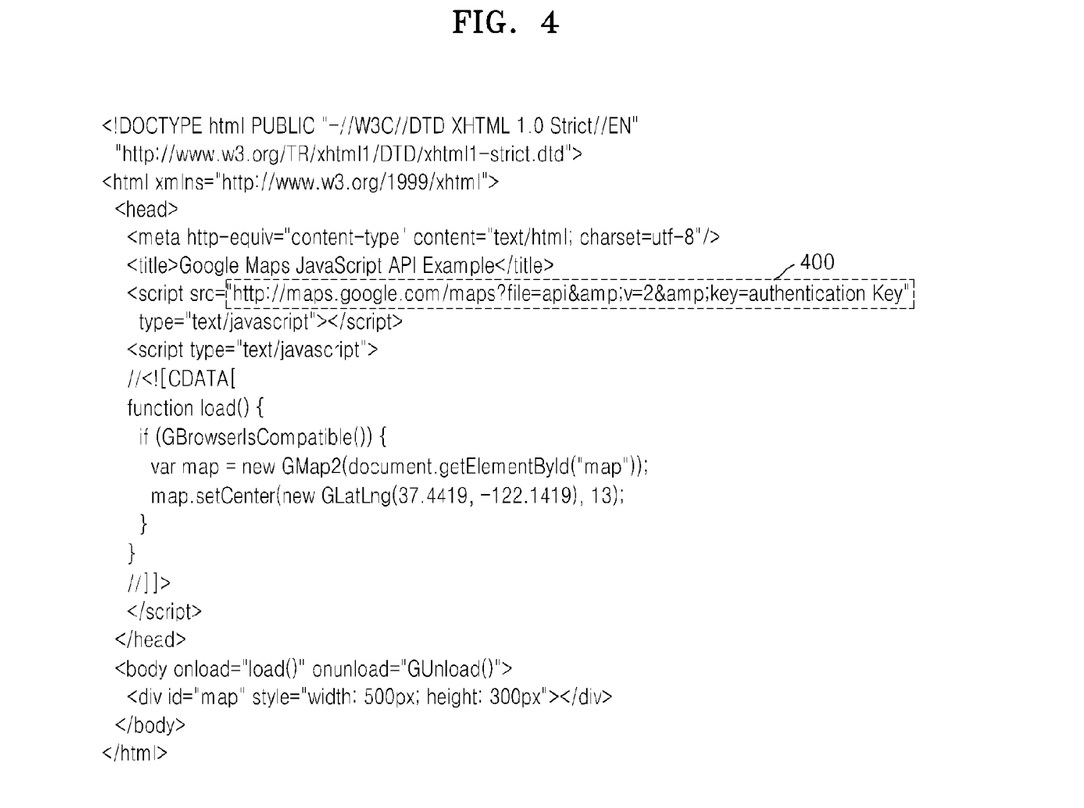
FIG. 4 is a script corresponding to an embodiment of a mashup service application provided to a device.

FIG. 4 is a script corresponding to an embodiment of a mashup service application provided to a device. As indicated by a box 400 in FIG. 4, an Open API address is written in a script of the mashup service application. An authentication key corresponding to the Open API address may or may not be written in the script. In FIG. 4, the authentication key is not written in the script.

Returning to FIG. 3, if the authentication key is not inserted in the provided mashup service application, an authentication key acquisition process is provided in Operation 302. The authentication key acquisition process can be provided in a variety of fashions, according to the design of an Open API provider. The authentication key acquisition process can be provided as an instruction to acquire an authentication key needed for each Open API, online or through UI of a device, whenever the service is provided.

Figure 5:
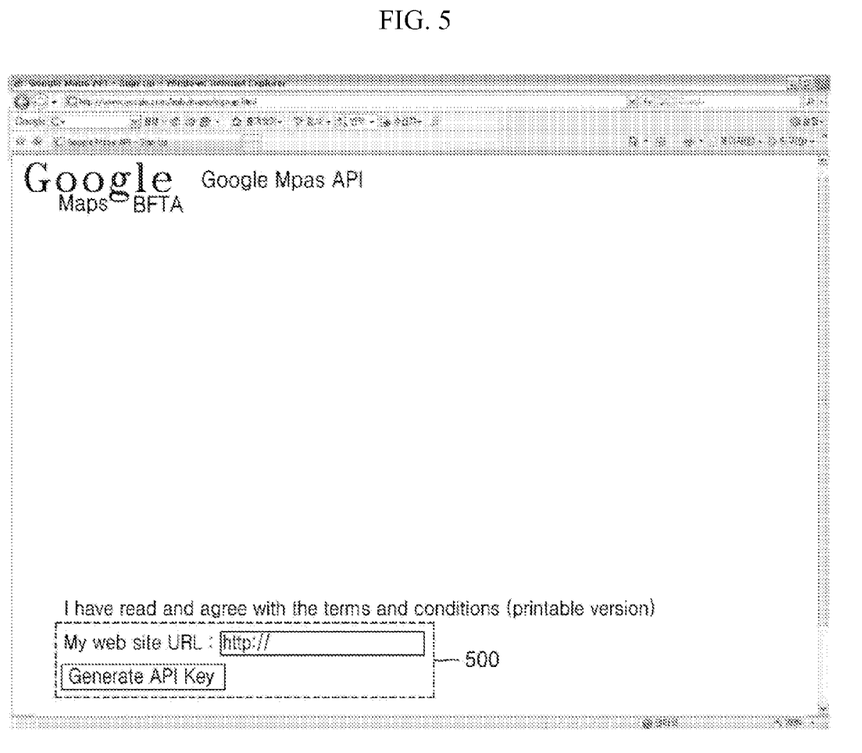
FIG. 5 is a screen capture of an example of providing an authentication key acquiring process.

FIG. 5 is a screen capture of an example of providing an authentication key acquiring process. As indicated by a box 500 of FIG. 5, a Google Maps API provider provides an authentication key acquisition process. The authentication key can be provided by inputting the IP address or URL (uniform resource locator). Other aspects of the invention may employ different authentication key acquisition processes.

Returning to FIG. 3, the authentication key is acquired following the provided acquisition process in Operation 304. For example, as shown in FIG. 5, when the IP address or URL of a device is input following the authentication key acquisition process, an authentication key corresponding to the Open API is provided by the Open API. The authentication key can be acquired as either a push download or a pull download. In push download, the authentication key is pushed down by the Open API provided to the device. In pull download, a device requests the Open API provider for the authentication key so that the authentication key is acquired from the Open API provider.

Whether the storage capacity of the device is sufficient to store the acquired authentication key is determined in Operation 306. However, since Operation 306 is not necessary, it is possible to execute Operation 308 after Operation 304. If the storage capacity of the device is sufficient to store the acquired authentication key, the acquired authentication key is stored by matching the acquired authentication key to the Open API address of the mashup service application in Operation 308.

Table 1 lists the matching results of the authentication keys and the Open API addresses as table information.

TABLE 1

| Index | Authentication Key | Open API Address (URL) |
|---|---|---|
| 1 | AAAA | http://openapi.naver.com/search?key=checking OpenAPI key & target=blog & query=checking key word & display=10&star.... |
| 2 | BBBB | http://www.aladdin.co.kr/ttb/api/search.aspx? TTBKey=Open API key.... |
| 3 | CCCC | http://maps.google.com/maps?file=api& v=2&key=OpenAPI key |
| 4 | .. | .. |

As shown in Table 1, the information on the authentication key is stored in a predetermined area of a device. The Open API address may include a URL (uniform resource locator). However, if the storage capacity of a device is insufficient to store the acquired authentication key, an error message, such as "The acquired authentication key cannot be stored", is displayed in Operation 310.

Figure 6:
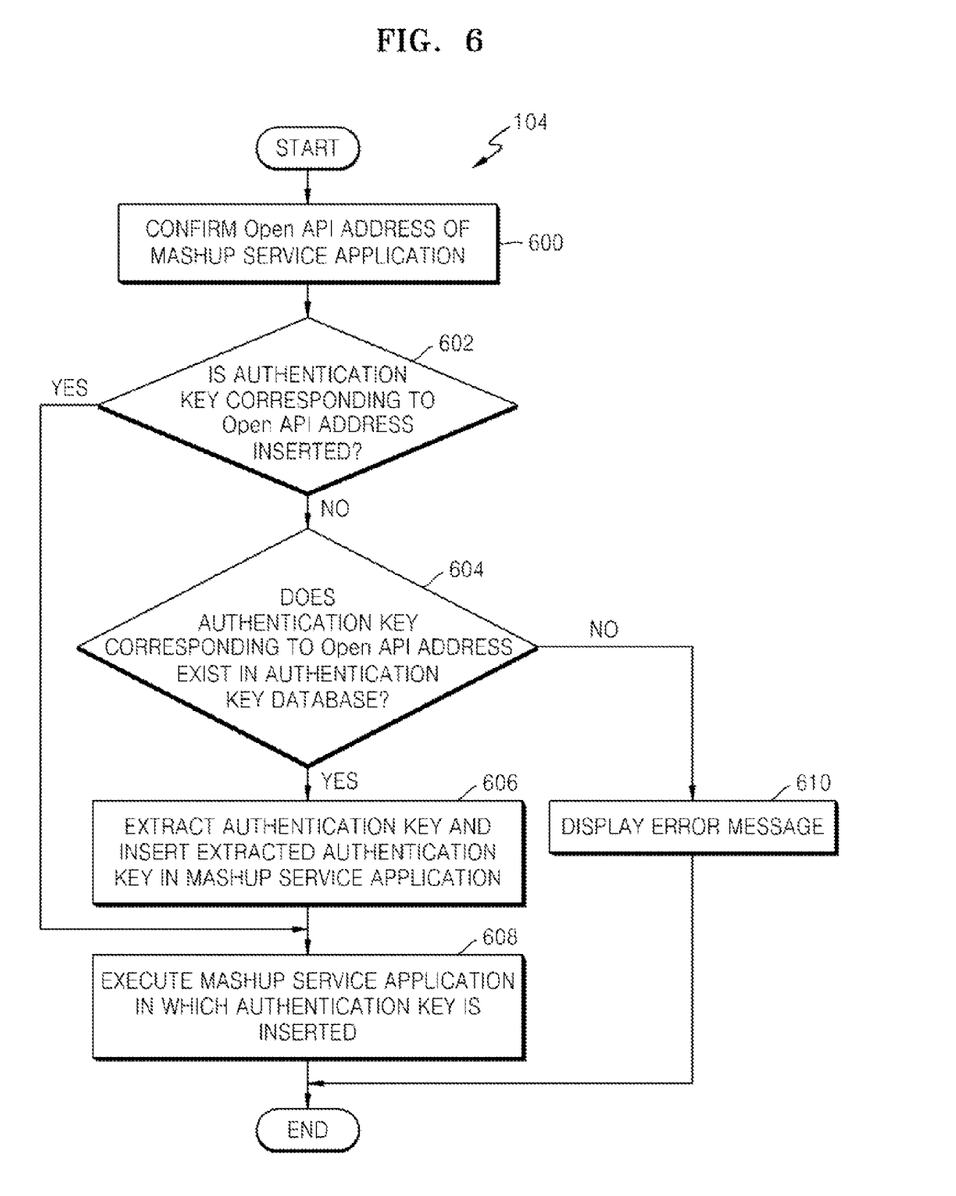
FIG. 6 is a flowchart explaining Operation 104 of FIG. 1.

Returning to FIG. 1, the mashup service application is executed using the acquired authentication key in Operation 104. FIG. 6 is a flowchart explaining Operation 104 of FIG. 1. The Open API address of the mashup service application is confirmed in Operation 600. For example, assuming that the mashup service application to be executed is the one shown in FIG. 4, the Open API address of the mashup service application, "http://maps.google.com/maps?file=api&v=2&key", is confirmed by checking the script of FIG. 4.

Whether the authentication key corresponding to the confirmed Open API address is inserted is determined in Operation 602. For example, determining whether the authentication key corresponding to the Open API address, "http://maps.google.com/maps?file=api&v=2&key", is written is performed by checking the script of FIG. 4. If the authentication key is written, since there is no need to insert a separate authentication key, Operation 608 is performed to execute the mashup service application.

However, if the authentication key is not inserted, whether the authentication key corresponding to the Open API address exists in an authentication key database stored in the device is determined in Operation 604. If the authentication key is not written to the script of the mashup service application, whether the authentication key corresponding to the Open API address of the mashup service application exists in the authentication key database matching the Open API address stored in Operation 204 is determined. For example, whether the authentication key corresponding to the Open API address of FIG. 4, "http://maps.google.com/maps?file=api&v=2&key", exists in Table 1 is determined. If the authentication key corresponding to the Open API address exists in the database, a corresponding authentication key is extracted and inserted in the mashup service application in Operation 606. For example, the index number 3 of Table 1 stores the authentication key "CCCC" corresponding to the Open API address of "http://maps.google.com/maps?file=api&v=2&key". Thus, the authentication key "CCCC" is extracted and inserted in the script of the mashup service application.

The mashup service application where the authentication key is inserted is executed in Operation 608. By executing the mashup service application, a mashup service desired by the user is provided.

Figure 7:
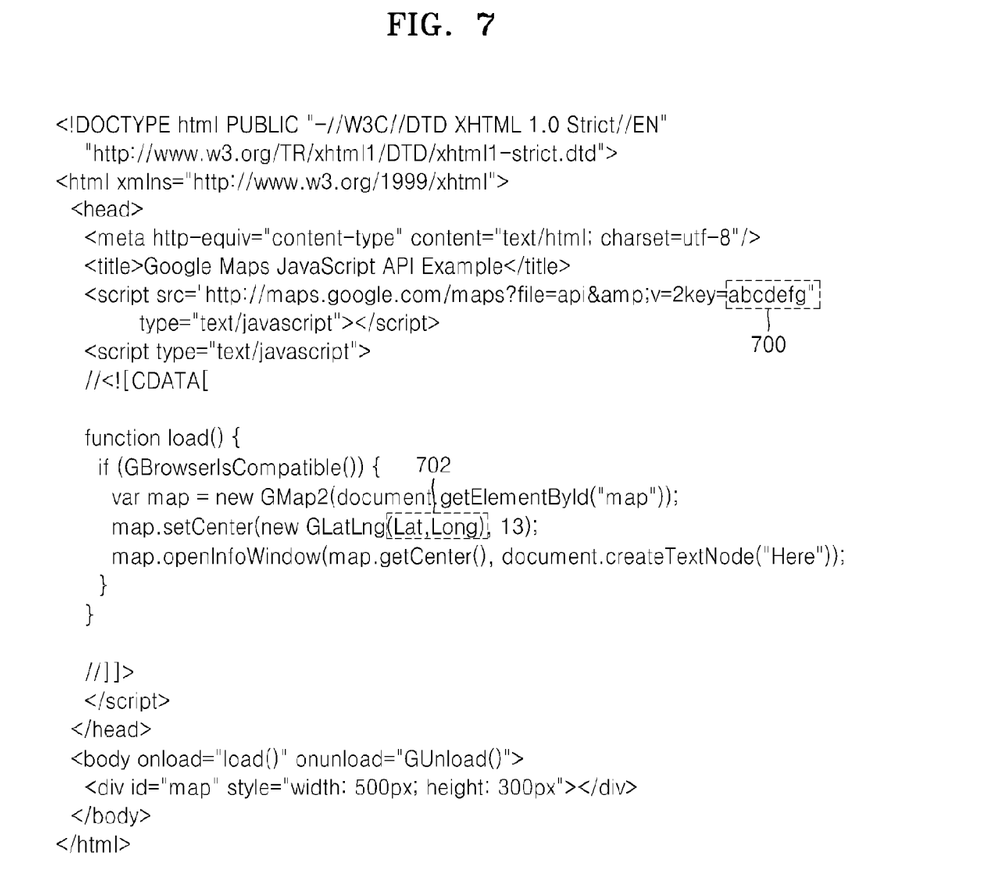
FIG. 7 is a script showing an example of a mashup service application to print a photographed image and a position of the photographed image on a map.

FIG. 7 is a script showing an example of a mashup service application to print a photographed image and a position of the photographed image on a map. FIG. 7 shows a mashup service application to simultaneously print a photographing position and an image photographed by a digital camera having a GPS using Google MAP API. Whether an authentication key corresponding to the authentication key of a script of the mashup service application provided by an external device exists is determined. The corresponding authentication key is extracted from the database and inserted in the script.

Figure 8:
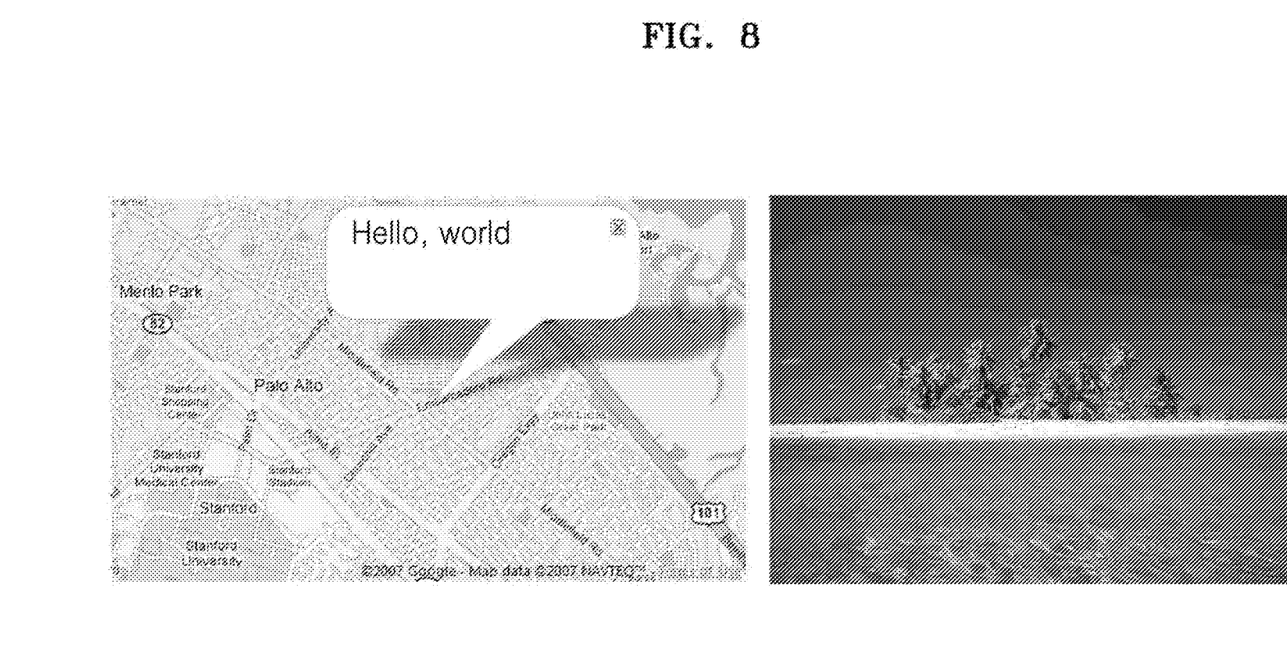
FIG. 8 is a printout of the position of a photographed image on a map and a corresponding image by the execution of the mashup service application of FIG. 7.

Information on a position on a map where the image is photographed is extracted from exit information about the image provided by the digital camera. The information "abcdefg" of the authentication key is inserted in a box 700 in the execution code of the mashup service application. The extracted position information is inserted in GPS positional information (Lat, Long) corresponding to a box 702 of the mashup service application. Then, the mashup service application is executed. FIG. 8 is a printout of the position of a photographed image on a map and a corresponding image by the execution of the mashup service application of FIG. 7. Thus, the user can easily identify the position where the image is photographed.

Returning to FIG. 6, if the authentication key corresponding to the Open API address does not exist in the database, an error message, such as "The mashup service application cannot be executed", is displayed in Operation 610. Since the mashup service application can only be executed when the authentication key exists, if the authentication key does not exist in the database, a message is displayed. The above-described mashup service support process can be executed at a host or an image forming apparatus independent of the host.

Aspects of the invention can also be embodied as computer readable codes on a computer readable recording medium. The computer readable recording medium is any data storage device that can store data which can thereafter be read by a computer system. Examples of the computer readable recording medium include read-only memory (ROM), random-access memory (RAM), CD-ROMs, magnetic tapes, floppy disks, optical data storage devices, and DVDs. The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

A mashup service support apparatus according to an embodiment of the present invention will be described below with reference to the accompanying drawings.

Figure 9:
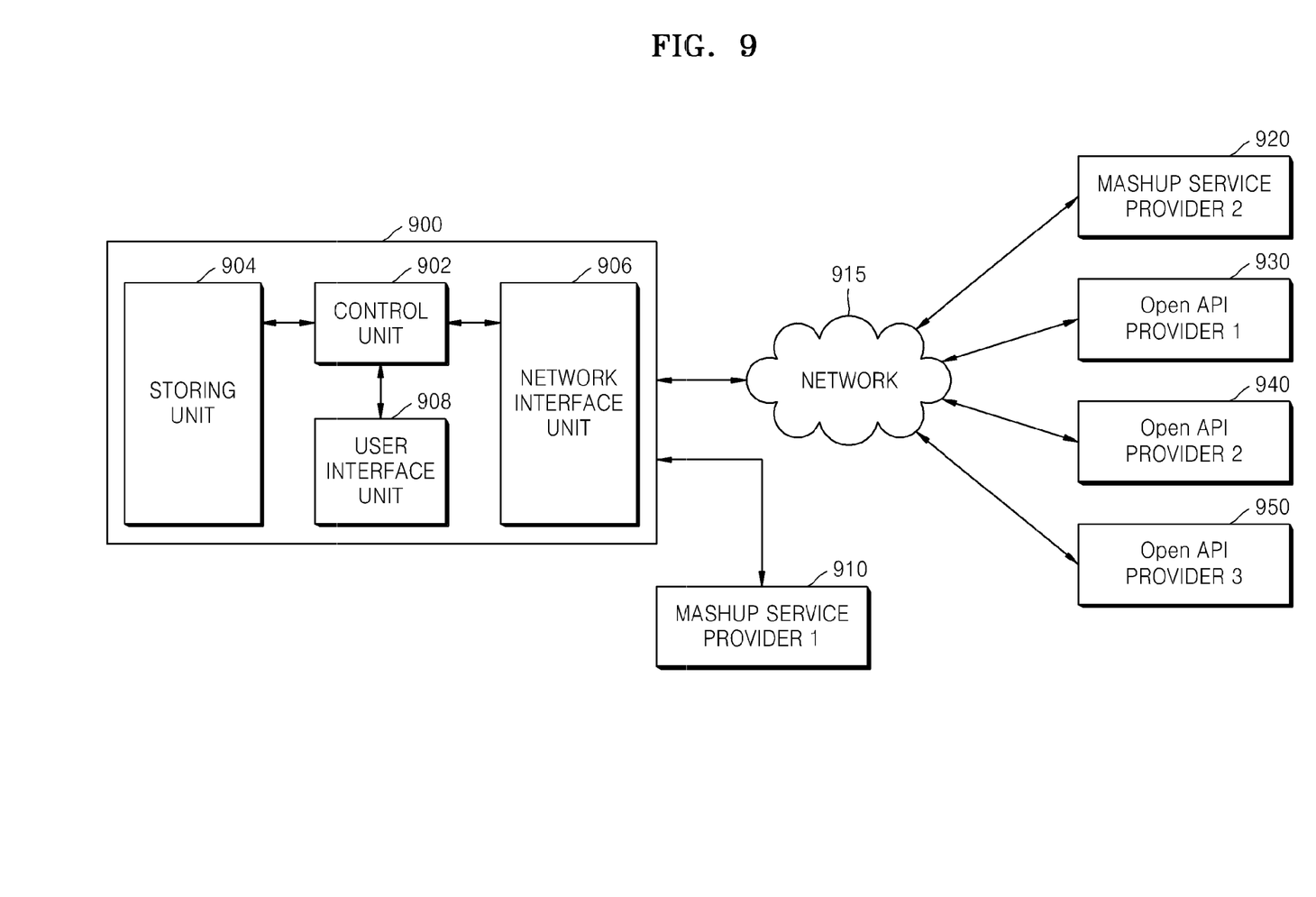
FIG. 9 is a block diagram of a mashup service support apparatus according to an embodiment of the present invention.

FIG. 9 is a block diagram of a mashup service support system according to an embodiment of the present invention. The mashup service support apparatus includes a device 900, mashup service provider 1 910, a network 915, mashup service provider 2 920, and Open API providers 1-3 930, 940, and 950. The device 900 includes the mashup service support apparatus. To this end, the device 900 includes a control unit 902, a storing unit 904, a network interface unit 906, and a user interface unit 908. The device 900 including the mashup service support apparatus can be included in an image forming apparatus such as a printer or multifunctional device or in a host. According to other aspects of the invention, the system and the device 900 may include additional and/or different units. Similarly, the functionality of two or more of the above units may be integrated into a single component.

The mashup service provider 1 910 is a mashup service provider connected to the device 900 and includes a local computer or a portable memory. The mashup service provider 1 910 transmits a mashup service application to the device 900 through a USB (universal serial bus) cable. The mashup service application may be an application including device-executable codes including binary codes, execution codes, source codes, and/or web pages.

The network 915 includes Ethernet and Internet connected to the device 900 through a wired/wireless network. The mashup service provider 2 920 transmits a mashup service application to the device 900 through the network 915. The network interface unit 906 of the device 900 transmits and receives data and receives a mashup service application from mashup service providers 1 and 2 910 and 920. The received mashup service application is stored in the storing unit 904 under the control of the control unit 902. The network interface unit 906 receives the mashup service application and the authentication key through a universal interface including USB and Bluetooth.

The control unit 902 determines whether the storage capacity of the device 900 is sufficient to store the mashup service application. When the storage capacity of the device 900 is sufficient to store the mashup service application, the control unit 902 controls the mashup service application to be stored in the device 900. However, when the storage capacity of the device 900 is insufficient to store the mashup service application, the control unit 902 controls an error message, such as "The mashup service application cannot be stored", to be displayed. The error message is displayed through the user interface unit 908 under the control of the control unit 902.

The control unit 902 acquires and manages an authentication key corresponding to the mashup service application provided by the mashup service provider 920 and uses the acquired authentication key to execute the mashup service application. The control unit 902 determines whether the authentication key is inserted in the provided mashup service application. If the authentication key is not inserted in the mashup service application, the control unit 902 controls the acquisition of the authentication key following an authentication key acquisition process. The authentication key acquisition process can vary according to the design of an Open API provider. The authentication key acquisition method can be provided as an instruction to acquire an authentication key needed for each Open API, online or through UI of a device, whenever the service is provided. The acquisition key may be acquired from Open API providers 1-3 930, 940, and 950 using a push download or a pull download. The control unit 902 determines whether the storage capacity of the device 900 is sufficient to store the acquired authentication key. If the storage capacity of the device 900 is sufficient to store the acquired authentication key, the control unit 902 stores the acquired authentication key by matching the acquired authentication key to the Open API address of the mashup service application. The Open API address includes URL.

However, when the storage capacity of the device 900 is insufficient to store the acquired authentication key, the control unit 902 controls an error message, such as "The authentication key cannot be stored", to be displayed. The error message is displayed through the user interface unit 908 according to the control of the control unit 902.

The user interface unit 908 displays the error message as described above. Also, the user interface unit 908 receives an instruction from a user to instruct the execution of a mashup service application and outputs an execution command signal of the user to the control unit 902.

According to the execution command signal, the control unit 902 determines whether an authentication key corresponding to the mashup service application exists in the storing unit 904, extracts the authentication key corresponding to the mashup service application, and inserts the extracted authentication key in the mashup service application to execute the mashup service application. The storing unit 904 stores a database of mashup service applications and authentication keys.

As described above, since the mashup service support method and apparatus according to aspects of the present invention stores and manages an authentication key value to normally operate a mashup service application through Open API, a user can use a variety of web services. Since the Open API may need an authentication process to allow use, the authentication key is managed by a device and a method to provide the authentication key to a web service is provided so that the web service using the Open API can be efficiently used.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A mashup service support method comprising:
externally receiving a mashup service application, comprising a plurality of Open Application Programming Interfaces (APIs), in an image forming apparatus;
acquiring and managing authentication keys corresponding to the plurality of Open APIs of the received mashup service application in the image forming apparatus;
storing the authentication keys in an authentication key database in the image forming apparatus by matching each of the acquired authentication keys to an Open API address of each of the plurality of Open APIs of the received mashup service application; and
executing the received mashup service application in the image forming apparatus by inserting the stored authentication keys into the Open API address of each of the plurality of Open APIs.

2. The method of claim 1, wherein, the receiving of a mashup service application comprises receiving the mashup service application through a LAN or wired/wireless network.

3. The method of claim 1, wherein the mashup service application is an application comprising device-executable codes including binary codes, execution codes, source codes, and/or web pages.

4. The method of claim 1, wherein the receiving of a mashup service application comprises:
receiving the mashup service application; and
storing the mashup service application in a device.

5. The method of claim 4, wherein the receiving of a mashup service application further comprises:
determining whether a storage capacity of the device is sufficient to store the mashup service application; and
receiving the mashup service application when the storage capacity of the device is sufficient to store the mashup service application.

6. The method of claim 5, wherein the receiving of a mashup service application further comprises displaying an error message, when the storage capacity of the device is insufficient to store the mashup service application.

7. The method of claim 1, wherein the acquiring and managing of the authentication keys further comprises:
determining whether the authentication keys are inserted in the received mashup service application; and
acquiring the authentication keys according to an authentication key acquisition process when the authentication keys are not inserted in the received mashup service application.

8. The method of claim 7, wherein, in the acquiring of the authentication keys, the authentication keys are acquired from an Open API provider using a push download or a pull download.

9. The method of claim 7, wherein the Open API address includes URL (uniform resource locator).

10. The method of claim 1, wherein the executing of the received mashup service application comprises:
confirming the Open API address of each of the plurality of Open APIs of the received mashup service application;
determining whether an authentication key corresponding to the confirmed Open API address is inserted; and
executing the received mashup service application when the authentication keys corresponding to the plurality of Open APIs are inserted.

11. The method of claim 10, wherein the executing of the received mashup service application further comprises:
determining whether the authentication keys corresponding to the Open API address of each of the plurality of Open APIs exists in the authentication key database when the authentication keys are not inserted; and
extracting the corresponding authentication keys and inserting the extracted authentication keys in the mashup service application when the authentication keys corresponding to the Open API address of each of the plurality of Open APIs exist.

12. The method of claim 11, wherein the executing of the received mashup service application further comprises:
displaying an error message when the authentication key corresponding to the Open API address of each of the plurality of Open APIs do not exist.

13. A mashup service support apparatus comprising:
a network interface unit to transmit and receive data;
a control unit in an image forming apparatus to externally receive a mashup service application comprising a plurality of Open Application Programming Interfaces (APIs), to acquire and manage authentication keys corresponding to the plurality of Open APIs of the received mashup service application in the image forming apparatus, and to execute the mashup service application in the image forming apparatus by inserting the acquired authentication keys into an Open API address of each of the plurality of Open APIs; and
a storing unit including a memory to store the mashup service application and an authentication key database to store the authentication keys by matching each of the acquired authentication keys to the Open API address of each of the plurality of Open APIs of the received mashup service application.

14. The apparatus of claim 13, wherein the network interface unit receives the mashup service application and the authentication keys through a LAN or wired/wireless network.

15. The apparatus of claim 13, wherein the mashup service application is an application comprising device-executable codes including binary codes, execution codes, source codes, and/or web pages.

16. The apparatus of claim 13, wherein the control unit determines whether the authentication keys are inserted in the received mashup service application, and when the authentication keys are not inserted, the authentication keys are acquired according to an authentication key acquisition process.

17. The apparatus of claim 13, wherein the control unit determines whether the authentication keys corresponding to the mashup service application exists in the storing unit, extracts the authentication keys corresponding to the mashup service application if the authentication keys exist in the storing unit, and inserts the extracted authentication keys in the mashup service application to execute the mashup service application.

18. A mashup service providing system, comprising:
a plurality of mashup service providers to provide at least one mashup service application;
a plurality of application program interface (API) providers to provide at least one API and corresponding authentication keys; and
an image forming apparatus including a memory to request the at least one mashup service application comprising a plurality of Open APIs from the corresponding mashup service providers via a network, to request authentication keys for the plurality of Open APIs corresponding to the at least one mashup service application via the network, and to store the requested authentication keys received from the plurality of API providers in the memory by matching each of the requested authentication keys to an Open API address of each of the plurality of Open APIs of the mashup service application so as to allow a user to execute the at least one mashup service application in the image forming apparatus by inserting the stored authentication keys into the Open API address of each of the plurality of Open APIs.

19. A method of executing a mashup service application, the method comprising:
receiving a command to execute a mashup service application comprising a plurality of Open Application Programming Interfaces (APIs);
extracting authentication keys corresponding to the plurality of Open APIs of the mashup service application from a local storage unit;
storing the extracted authentication keys in an authentication key database by matching each of the extracted authentication keys to an Open API address of each of the plurality of Open APIs of the mashup service application; and
executing the mashup service application in an image forming apparatus by inserting the stored authentication keys into the Open API address of each of the plurality of Open APIs.

20. The method of claim 19, further comprising:
acquiring the authentication keys from an application program interface (API) provider; and
storing the authentication keys in the local storage unit together with a mapping relating the authentication keys to corresponding mashup service applications.

21. A mashup service support apparatus comprising:
a storage unit including a memory; and
a controller in an image forming apparatus to request a mashup service application comprising a plurality of Open Application Programming Interfaces (APIs) and to store the mashup service application in the memory in the storage unit, to request authentication keys for the plurality of Open APIs corresponding to the mashup service application and to store the authentication keys in an authentication key database in the storage unit together by matching each of the requested authentication keys to an Open API address of each of the plurality of Open APIs of the mashup service application, and to execute the mashup service application in the image forming apparatus by inserting the authentication keys into the Open API address of each of the plurality of Open APIs.

* * * * *